United States Patent
Hughes et al.

(10) Patent No.: US 7,958,197 B2
(45) Date of Patent: Jun. 7, 2011

(54) DYNAMIC TYPE-AHEAD FOR LISTS OF PRIOR SPECIFIED ADDRESSEES

(75) Inventors: Rebecca Hughes, Cambridge, MA (US); Nancy E. Kho, Belmont, MA (US); Jamie Liu, Westford, MA (US); Judy J. Piper, Woburn, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/605,223

(22) Filed: Oct. 23, 2009

(65) Prior Publication Data

US 2011/0099220 A1 Apr. 28, 2011

(51) Int. Cl.
*G06F 13/00* (2006.01)

(52) U.S. Cl. .......................... 709/206; 709/219; 719/328

(58) Field of Classification Search .................. 709/204, 709/206, 217, 219; 719/328, 329
See application file for complete search history.

(56) References Cited

U.S. PATENT DOCUMENTS

| | | | |
|---|---|---|---|
| 6,901,559 B1 | 5/2005 | Blum et al. | |
| 6,952,805 B1 | 10/2005 | Tafoya et al. | |
| 7,181,497 B1 | 2/2007 | Appelman et al. | |
| 7,200,638 B2 | 4/2007 | Lake | |
| 2005/0102368 A1 | 5/2005 | Forman et al. | |
| 2007/0294428 A1 | 12/2007 | Guy et al. | |
| 2008/0005685 A1 | 1/2008 | Drews et al. | |
| 2008/0147639 A1 | 6/2008 | Hartman et al. | |
| 2008/0168360 A1 | 7/2008 | Wilson | |
| 2009/0044094 A1* | 2/2009 | Rapp | 715/220 |
| 2009/0313597 A1* | 12/2009 | Rathbone et al. | 717/100 |
| 2010/0223547 A1* | 9/2010 | Wilson et al. | 715/261 |

* cited by examiner

*Primary Examiner* — Viet Vu
(74) *Attorney, Agent, or Firm* — Steven M. Greenberg, Esq.; Carey, Rodriguez, Greenberg & Paul LLP

(57) ABSTRACT

Embodiments of the present invention provide a method, system and computer program product for type-ahead processing for multiple different addressees. In an embodiment of the invention, a method for type-ahead processing for multiple different addressees can include detecting character input in an addressee field of a composition view of a messaging client executing in memory by a processor of a computer. The method also can include matching the detected character input to entries in a table of different lists in that each of the entries in the table includes multiple different addressees specified for a previously composed message. Finally, the method can include auto-completing the addressee field with a selected list of multiple different addressees matching the detected character input.

14 Claims, 2 Drawing Sheets

DYNAMIC TYPE-AHEAD FOR LISTS OF PRIOR SPECIFIED ADDRESSEES

BACKGROUND OF THE INVENTION

1. Field of the Invention

The present invention relates to the field of electronic messaging and more particularly to type-ahead processing for electronic messages in a messaging client.

2. Description of the Related Art

Electronic messaging represents the single most useful task accomplished over wide-scale computer communications networks. Some argue that in the absence of electronic messaging, the Internet would have amounted to little more than a science experiment. Today, electronic messaging seems to have replaced the ubiquitous telephone and fax machine for the most routine of interpersonal communications. As such, a variety of electronic messaging systems have arisen which range from real-time instant messaging systems and wireless text pagers to asynchronous electronic mail systems.

Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties. Today, more e-mails are processed in a single hour than phone calls. Clearly, e-mail as a mode of communications has been postured to replace all other modes of communications, save for voice telephony.

It is well understood that an e-mail message before transmission must be addressed to at least one recipient. The most basic e-mail clients permit the end user to manually specify an address—either a specific e-mail address formatted for Internet transmission such as john.doe@mycompany.com, or by alias such as John Doe/New York/MyCompany. More advanced e-mail clients support an address book and the use thereof in selecting one or more recipients for an addressee of an e-mail. In this instance, an address book entry, once selected for insertion into an addressee field of an e-mail message can be transposed into an e-mail address, or can be represented by the address book name of the addressee such as John Doe and translated at the time of transmission into an Internet address such as john.doe@mycompany.com.

Type-ahead processing has become part and parcel of the modern e-mail client. Type-ahead processing refers to the auto-completion of a manually specified recipient in an addressee field of an electronic message under composition. The typical program logic supporting type-ahead processing monitors the entry of characters in an addressee field of an electronic message under composition and compares the characters to entries in a table of known addressees—whether that table is a table of addresses previously specified for previous messages, or whether that table is an address book populated by entries provided by the end user or an administrator of an organizational directory. As the logic locates one or more entries in the table, a best matching entry, or even a selection of some or all of the matching entries can be provided in a list for the end user to select a single entry to be inserted in the addressee field as the intended recipient of the message.

Type-ahead processing remains critical for most end users whom have become accustomed to the convenience afforded by the type-ahead processing function. Notwithstanding, limitations remain in the ability of type-ahead processing to satisfy the unique circumstance of specifying multiple different addressees in an addressee field. At present, to accommodate multiple different addressees, type-ahead processing handles one addressee at a time. Alternatively, type-ahead processing can recall the name of a pre-defined group of addressees where such group had been previously defined, for example "ALL STAFF" or "ACCOUNTING DEPARTMENT". In any event, to accommodate multiple different addressees in a message under composition, the end user must remember all desired addressees to receive a message under composition though in the past the end user may have already specified a complete listing of the desired addressees for the message under composition.

BRIEF SUMMARY OF THE INVENTION

Embodiments of the present invention address deficiencies of the art in respect to auto-completion of an addressee field in a composition view of a messaging client, and provide a novel and non-obvious method, system and computer program product for type-ahead processing for multiple different addressees. In an embodiment of the invention, a method for type-ahead processing for multiple different addressees can include detecting character input in an addressee field of a composition view of a messaging client executing in memory by a processor of a computer. The method also can include matching the detected character input to entries in a table of different lists in that each of the entries in the table includes multiple different addressees specified for a previously composed message. Finally, the method can include auto-completing the addressee field with a selected list of multiple different addressees matching the detected character input.

In one aspect of the embodiment, auto-completing the addressee field with a selected list of multiple different addressees matching the detected character input can include displaying a set of the different lists matching the detecting character. One of the different lists in the set and each different addressee in the selected one of the different lists can be inserted into the addressee field. Optionally, displaying a set of the different lists matching the detecting character can include displaying a set of the different lists matching the detected character along with a context for each of the different lists matching the detected character. In this regard, the context for each of the different lists matching the detected character can include a date of transmission of a previously composed message for each of the different lists matching the detected character or a message type of a previously composed message for each of the different lists matching the detected character.

In another embodiment of the invention, a message processing system can be provided. The message processing system can include a computer with memory and a processor and an e-mail client executing in the memory by the processor of the computer. The e-mail client can be configured for communicative coupling to an e-mail server over a computer communications network. Finally, a type-ahead for recipient lists module can be coupled to the e-mail client. The module can include program code enabled to detect character input in an addressee field of a composition view of the e-mail client, to match the detected character input to entries in a table of different lists, each of the entries in the table comprising multiple different addressees specified for a previously composed message, and to auto-complete the addressee field with a selected list of multiple different addressees matching the detected character input.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for type-ahead processing for multiple different addressees. In accordance with an embodiment of the invention, characters inserted into an addressee field of a message within a composition view of a messaging client can be compared to different previously provided sets of multiple different addresses for previously transmitted messages. A best matching one of the sets can be selected and the multiple different addresses for the best matching one of the sets can be inserted into the addressee field as an auto-completion of the addressee field. Subsequently, the message can be transmitted to the multiple different addressees.

Figure 1A:
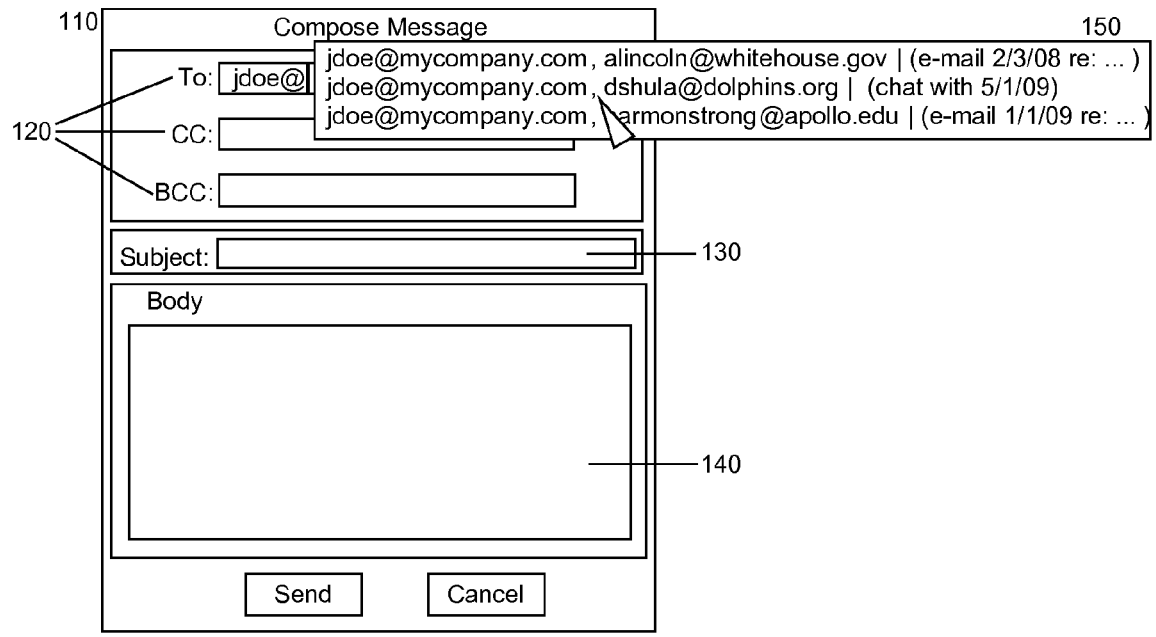
FIGS. 1A and 1B, taken together, are a pictorial illustration of a messaging client configured for type-ahead processing for multiple different addressees.
Figure 1B:
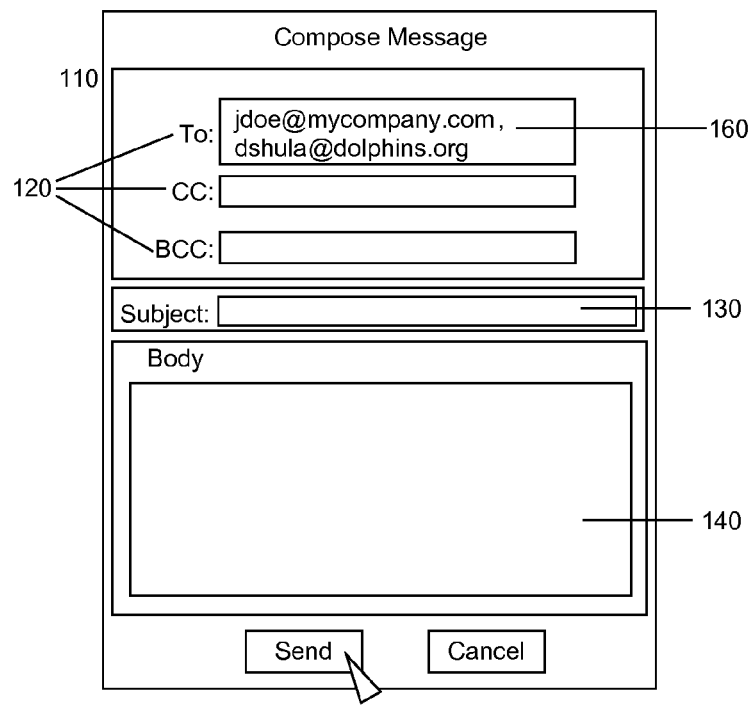

In further illustration, FIGS. 1A and 1B, taken together, are a pictorial illustration of a messaging client configured for type-ahead processing for multiple different addressees. As shown in FIG. 1A and FIG. 1B, a composition view 110 of a messaging client such as an e-mail client, an instant messaging client, a chat client, a social networking client, and the like, can provide for a body field 140 into which the text of a message can be provided by an end user, a subject field 130 into which a subject can be specified for the message by the end user, and one or more different addressee fields 120 into which different addressees can be specified for the message by the end user. Generally, the address fields 120 can include the traditional "To:", "CC:" and "BCC:" fields.

As the end user provides characters into any of the addressee fields 120, the provided characters can be compared to a table of previously specified lists of multiple different addressees in order to provide a set of matching lists 150 previously specified, for example for a previously composed message such as an e-mail or instant message, a previously specified attendee list for an instant meeting, or for previously specified tags of a photo. In this regard, each entry in the table of previously specified lists of multiple different addressees can include a selection of multiple different addressees for a single one of the addressee fields 120, for example, "jdoe@mycompany.com, alincoln@whitehouse.gov". Optionally, only a subset of the previously specified lists of the set of matching lists 150 need be provided where the previously specified lists are great in number. In this regard, the subset can be limited according to a fixed number of "top" matches based upon, by way of example, the most recently selected ones of the previously specified lists, or the most frequently selected ones of the previously specified lists.

Optionally, message characterization data can be provided in connection with each entry in the table indicating a context of a previously composed message for a corresponding list of different addressees in the set of matching lists 150. The context for a list of different addressees can include, for example, the date of transmitting the previously composed message to the list of different addressees. Alternatively, the context can include a message type of a message previously composed to the list of different addressees, such as an instant message (chat) or an e-mail.

Figure 2:
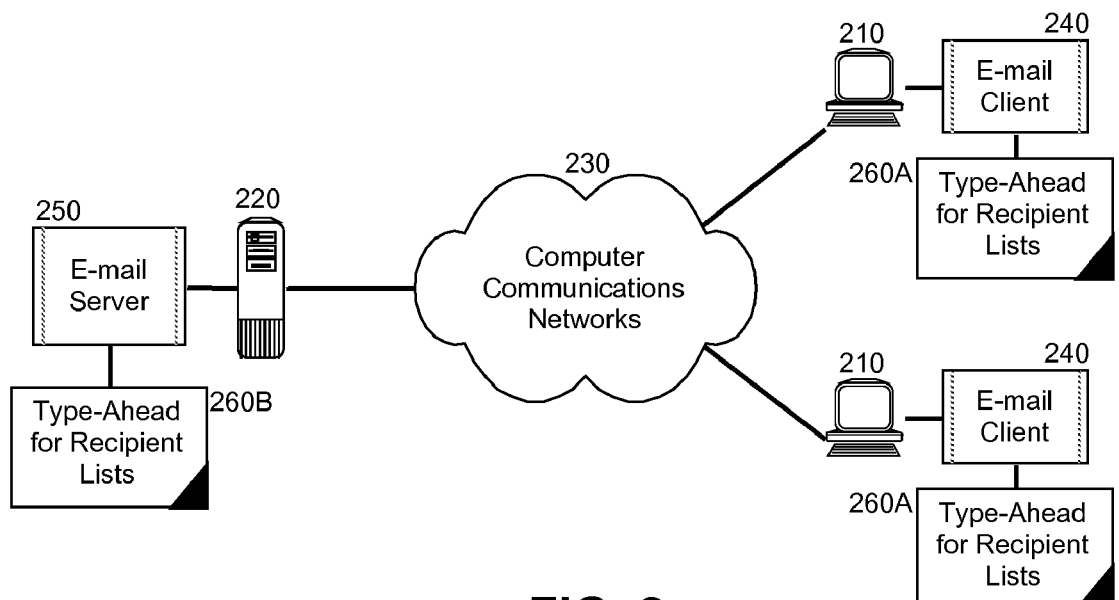
FIG. 2 is a schematic illustration of a message processing system configured for type-ahead processing for multiple different addressees; and, FIG. 3 is a flow chart illustrating a process for type-ahead processing for multiple different addressees.

In any event, the end user can select an entry in the set of matching lists 150 in response to which the selected entry 160 can be inserted into the given one of the addressee fields 120 as if the end user had manually provided each address in the selected entry 160. The process described in connection with FIGS. 1A and 1B can be implemented within a message processing data processing system. In further illustration, FIG. 2 is a schematic illustration of a message processing system configured for type-ahead processing for multiple different addressees. The message processing system can include a host computing platform 220 configured for communicative coupling to multiple different client computers 210 over computer communications network 230. The host computing platform 220 can include a messaging server such as an e-mail server 250 executing in memory by a processor of the host computing platform 220. Different e-mail clients 240 respectively executing in memory by a processor of a corresponding one of the client computers 210 can communicate with the e-mail server 250 so as to effectuate e-mail messaging—both inbound and outbound.

A type-ahead for recipient lists module 260A can be coupled to each of the e-mail clients 240. Alternatively, a type-ahead for recipient lists module 260B can be coupled to the e-mail server 250. In either case, the type-ahead for recipient lists module 260A, 260B can include program code that when executed by a processor of a computer while loaded in memory can detect the input of characters into an addressee field of a composition view of the e-mail client 240. The program code in response to detecting the input of a character or multiple characters into the addressee field can query a table of previously specified lists of addressees for previously composed messages and the program code can present a set of the previously specified lists of addressees that begin with or include the detected input of one or more characters. Finally, the program code in response to the selection of one of the previously specified lists of addressees in the set can auto-complete the addressee field with the selected one of the previously specified lists of addressees.

Figure 3:
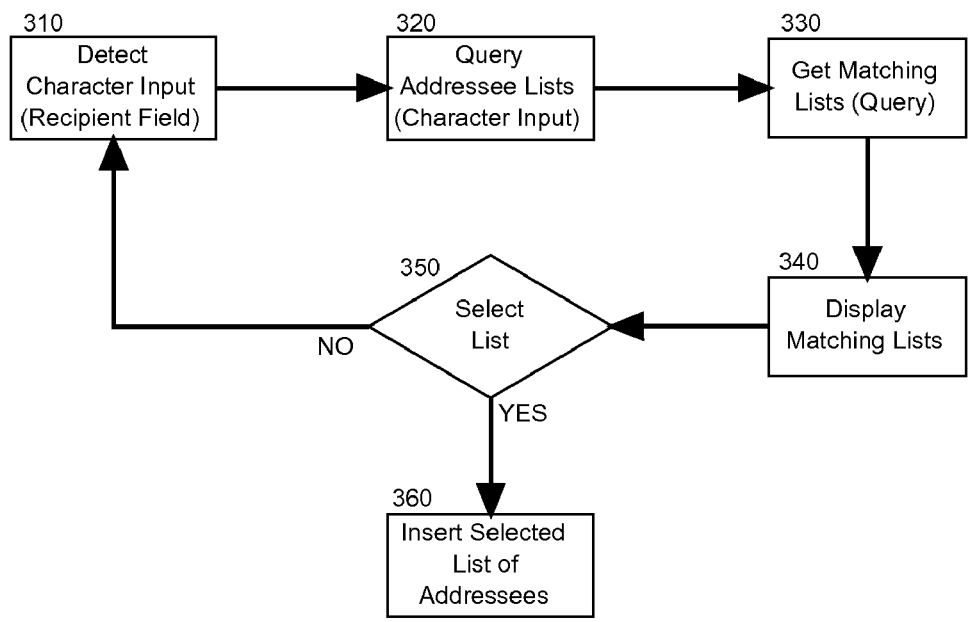

In even yet further illustration of the operation of the type-ahead for recipient lists module 260A, 260B, FIG. 3 is a flow chart illustrating a process for type-ahead processing for multiple different addressees. Beginning in block 310, character input can be detected in an addressee field of a composition view of a messaging client such as an e-mail client. In block 320, a table of previously specified lists of addresses for previously composed messages can be queried with the character input to locate previously specified lists that include the character input. For example, the table of previously specified lists of addresses for previously composed messages can be queried with the character input to locate previously specified lists that begin with the character input.

In block 330, a set of matching lists in the table of previously specified lists can be retrieved and presented in connection with the addressee field in block 340. In decision block 350, it can be determined whether or not a particular one of the matching lists in the set has been selected by the end user. If not, the process can repeat in block 310 with the detection of additional character input. However, if any of the matching lists in the set have been selected by the end user, in block 360, the selected one of the matching lists in the set can be used to auto-complete the addressee field as if the end user had provided the character input in the address field for each addressee in the selected one of the matching lists in the set.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for type-ahead processing for multiple different addressees, the method comprising:
    detecting character input in an addressee field of a composition view of a messaging client executing in memory by a processor of a computer;
    matching the detected character input to entries in a table of different lists, each of the entries in the table comprising multiple different addressees specified for a previously composed message; and,
    auto-completing the addressee field with a selected list of multiple different addressees matching the detected character input.

2. The method of claim 1, wherein matching the detected character input to entries in a table of different lists, each of the entries in the table comprising multiple different addressees specified for a previously composed message, comprises identifying different lists in the table each of the identified different lists beginning with the detected character input.

3. The method of claim 1, wherein auto-completing the addressee field with a selected list of multiple different addressees matching the detected character input, comprises:
    displaying a set of the different lists matching the detecting character;
    selecting one of the different lists in the set; and,
    inserting each different addressee in the selected one of the different lists into the addressee field.

4. The method of claim 3, wherein displaying a set of the different lists matching the detecting character, comprises displaying a set of the different lists matching the detected character along with a context for each of the different lists matching the detected character.

5. The method of claim 4, wherein the context for each of the different lists matching the detected character comprises a date of transmission of a previously composed message for each of the different lists matching the detected character.

6. The method of claim 4, wherein the context for each of the different lists matching the detected character comprises a message type of a previously composed message for each of the different lists matching the detected character.

7. A message processing system comprising:
    a computer with memory and a processor;
    a messaging client executing in the memory by the processor of the computer, the messaging client being configured for communicative coupling to a messaging server over a computer communications network; and,
    a type-ahead for recipient lists module coupled to the messaging client, the module comprising program code enabled to detect character input in an addressee field of a composition view of the messaging client, to match the detected character input to entries in a table of different lists, each of the entries in the table comprising multiple different addressees specified for a previously composed message, and to auto-complete the addressee field with a selected list of multiple different addressees matching the detected character input.

8. The system of claim 7, wherein the messaging client is an e-mail client.

9. A computer program product comprising a non-transitory computer usable medium embodying computer usable program code for type-ahead processing for multiple different addressees, the computer program product comprising:
    computer usable program code for detecting character input in an addressee field of a composition view of a messaging client executing in memory by a processor of a computer;
    computer usable program code for matching the detected character input to entries in a table of different lists, each of the entries in the table comprising multiple different addressees specified for a previously composed message; and,
    computer usable program code for auto-completing the addressee field with a selected list of multiple different addressees matching the detected character input.

10. The computer program product of claim 9, wherein the computer usable program code for matching the detected character input to entries in a table of different lists, each of the entries in the table comprising multiple different addressees specified for a previously composed message, comprises computer usable program code for identifying different lists in the table each of the identified different lists beginning with the detected character input.

11. The computer program product of claim 9, wherein the computer usable program code for auto-completing the addressee field with a selected list of multiple different addressees matching the detected character input, comprises:
    computer usable program code for displaying a set of the different lists matching the detecting character;
    computer usable program code for selecting one of the different lists in the set; and,
    computer usable program code for inserting each different addressee in the selected one of the different lists into the addressee field.

12. The computer program product of claim 11, wherein the computer usable program code for displaying a set of the different lists matching the detecting character, comprises computer usable program code for displaying a set of the different lists matching the detected character along with a context for each of the different lists matching the detected character.

13. The computer program product of claim 12, wherein the context for each of the different lists matching the detected character comprises a date of transmission of a previously composed message for each of the different lists matching the detected character.

14. The computer program product of claim 12, wherein the context for each of the different lists matching the detected character comprises a message type of a previously composed message for each of the different lists matching the detected character.

* * * * *